United States Patent [19]

Cantey, Jr.

[11] E Patent Number: Re. 32,530

[45] Reissued Date of Patent: Oct. 27, 1987

[54] SHIPPING PALLET

[76] Inventor: Bryant W. Cantey, Jr., 2111 Cleveland St., Greenville, S.C. 29607

[21] Appl. No.: 712,251

[22] Filed: Mar. 15, 1985

Related U.S. Patent Documents

Reissue of:

[64] Patent No.: 4,482,051
Issued: Nov. 13, 1984
Appl. No.: 382,151
Filed: May 26, 1982

[51] Int. Cl. ..... B65D 71/00

[52] U.S. Cl. ..... 206/392; 206/386; 206/391; 206/499

[58] Field of Search ..... 206/386, 391, 392, 491, 206/493, 499, 516

[56] References Cited

U.S. PATENT DOCUMENTS

| | | | |
|---|---|---|---|
| 1,808,651 | 6/1951 | Gibb et al. | 206/499 |
| 2,588,791 | 3/1952 | Andrew, Jr. | 206/392 |
| 2,610,735 | 9/1952 | Ferguson | 206/392 |
| 2,662,638 | 12/1953 | Storer et al. | 206/499 |
| 2,699,866 | 1/1955 | Russell, Jr. | 206/392 |
| 3,335,858 | 8/1967 | Sibille | 206/392 |
| 3,730,340 | 5/1973 | Neubert | 206/386 |
| 3,804,234 | 4/1974 | Gordon | 206/392 |
| 4,042,108 | 8/1977 | Brethauer | 206/392 |

FOREIGN PATENT DOCUMENTS

| | | | |
|---|---|---|---|
| 0302331 | 10/1965 | Netherlands | 206/392 |

*Primary Examiner*—William Price
*Assistant Examiner*—Jimmy G. Foster
*Attorney, Agent, or Firm*—Bailey & Hardaway

[57] ABSTRACT

An article support for use with a Shipping Pallet having a flange area to interlock between sheets of rigid material, an article locator for positioning of shipped articles and a ledge area associated with each article locator to prevent the article from contamination and causing wear to the rigid material.

1 Claim, 3 Drawing Figures

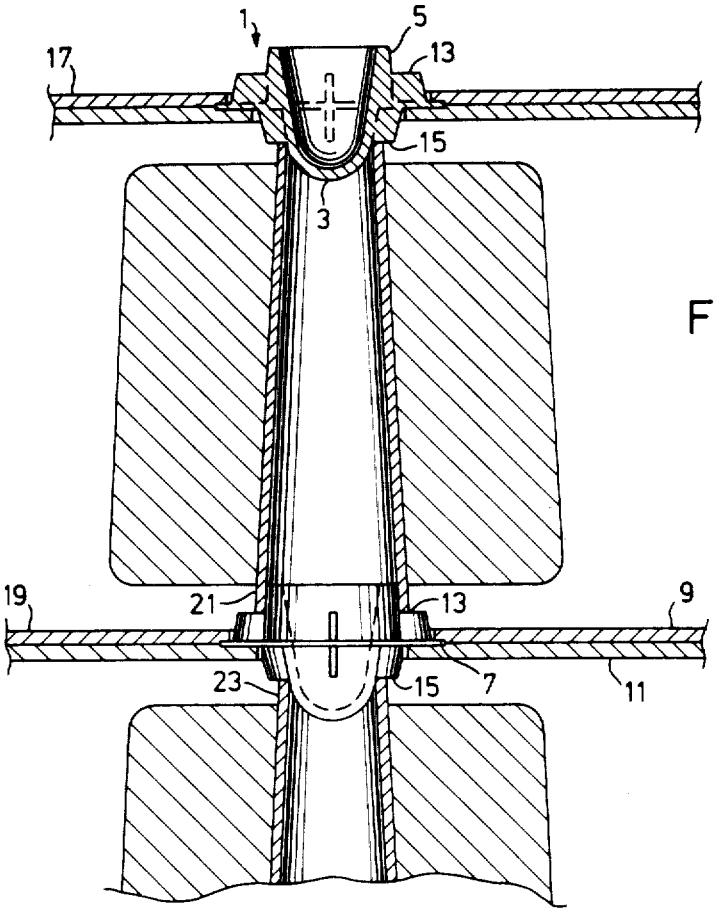
FIG.2
FIG.1
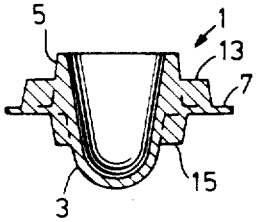

SHIPPING PALLET

Matter enclosed in heavy brackets [ ] appears in the original patent but forms no part of this reissue specification; matter printed in italics indicates the additions made by reissue.

BACKGROUND OF THE INVENTION

This invention relates generally to the art of shipping and more particularly to a shipping pallet for use during shipping a plurality of articles.

There are many articles shipped in commerce which must be grouped and appropriately stabilized for shipment. The grouping and stabilization usually involves some sort of shipping support or container which itself represents a significant investment. It is thus prefered that means for shipment be reusable and returnable in a form which involves a minimization of weight and volume.

One such article which is shipped in commerce and is subject to the above limitations is wound cores of textile threads. These articles are normally wound on a central support which is generally referred to as a cone spool cop or bobbin. For purposes of this document the central support will be referred to as a yarn bobbin.

Various prior art devices have existed for use during shipment of a plurality of yarn bobbins having wound yarn thereon. One such device is disclosed in U.S. Pat. No. 2,610,735 wherein an article locator having a central flange area is trapped between two pieces of paperboard with the locator protruding from either side of the paperboard in order to centrally locate a yarn bobbin thereon in the hollow thereof. The yarn bobbin thus is located by the locator but rests upon and contacts the paperboard.

Another such device is described in U.S. Pat. No. 4,042,108 wherein a unitary plastic structure is utilized as a shipping pallet and comprises a plurality of bullet shaped protuberances which are arranged so as to provide for minimum space comsumption upon return shipment. Another unitary plastic device for use as a shipping pallet is described in U.S. Pat. No. 3,335,858 to Sibille.

Another shipping device is disclosed in U.S. Pat. No. 3,804,234 to Gordan wherein yarn bobbins are essentially boxed within a support structure formed from corrugated cardboard. Another corrugated cardboard device is described in U.S. Pat. No. 1,808,651 to Gibb et al.

While all prior art devices have functioned to ship articles such devices have suffered from various short comings including rapid deterioration of paperboard and corrugated material due to the heavy workload thereof or the inability of unitary molded structures to be readily reused due to the breakage of such molded structures during use.

SUMMARY OF THE INVENTION

It is thus an object of this invention to provide a novel shipping pallet for use in shipping a plurality of articles.

It is a further object of this invention to provide such a shipping pallet which combines the desirable features of the prior art devices but which eliminates the short comings thereof.

It is a still further and more particular object of this invention to provide a shipping pallet which utilizes paperboard or corrugated cardboard in a manner so as to eliminate substantial wear thereof during shipment but which is readily returnable in a nesting relationship.

These as well as other objects are accomplished by a shipping pallet having a plurality of article support members each of which comprises a flange area, a ledge area and an article locator. The flange area is trapped between two layers of rigid material such as paperboard or corrugated cardboard with the ledge areas thereof rising through the plane of the rigid material to support the articles and prevent them from contacting the rigid material. A plurality of the article support members are arranged on a single pallet such that layers of article may be supported one above the other during shipment without the weight of the various layers causing the rigid material to be compressed thereby and with the pallet possessing the ability to be conveniently nested for return shipment.

BRIEF DESCRIPTION OF THE DRAWINGS

FIG. 1 of the drawings illustrates in section view an article support member in accordance with this invention.

FIG. 2 of the drawings illustrates the article support member incorporated into a shipping pallet and supporting wound yarn bobbins.

DETAILED DESCRIPTION

Figure 3:
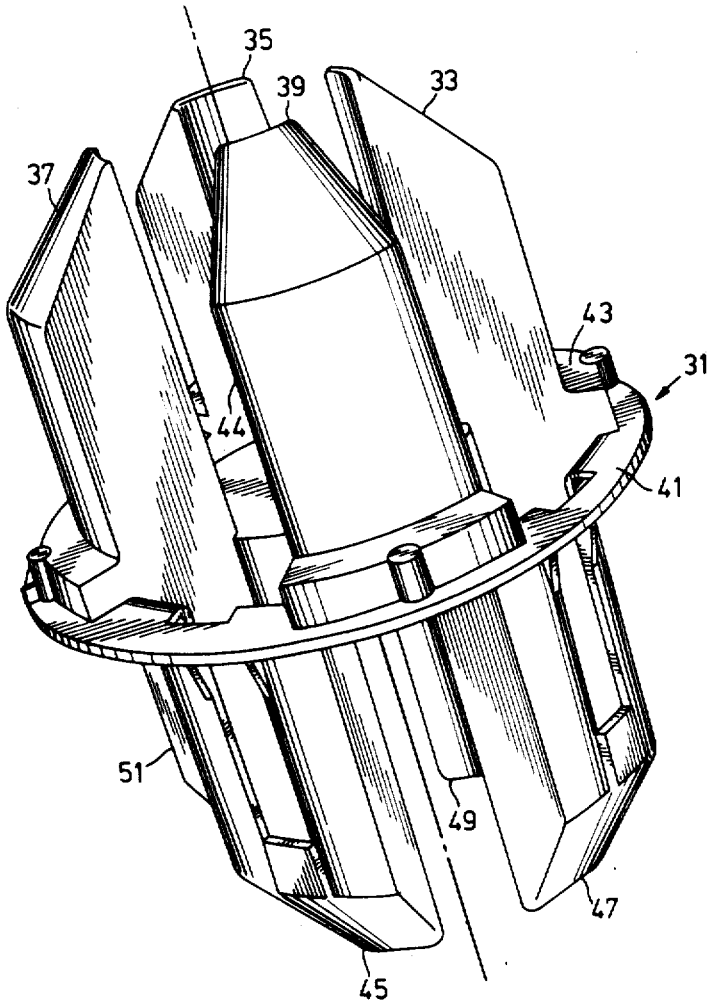
FIG.3 PRIOR ART
FIG. 3 of the drawings illustrates in perspective view a further embodiment of [an article support member in accordance with] *a prior art device which may be utilized with modifications in* this invention.

In accordance with this invention an improvement of the construction has been found to the construction illustrated in the above referenced U.S. Pat. No. 2,610,735 to Ferguson which is herein incorporated by reference. In accordance with this invention it has been found that significant wear results from the construction illustrated in the Ferguson patent, due to the contact thereof of yarn bobbins and the rigid material which is usually pasteboard or corrugated cardboard. This invention thus comprises an article support number which is capable of use between sheets of rigid material but which comprises a ledge member for supporting of the articles being shipped and for preventing contact between the shipped articles and generally rigid material. Further description will be given with reference to the various figures of drawing appended hereto.

FIG. 1 of the drawings illustrates in cross section view an article support member in accordance with this invention. The article support member comprises on at least one side thereof an article locator 3 and may comprise a second article locator 5 on the other side thereof. The article support member comprises a flange area 7 for lodging the article support member 1 between two planar sheets of rigid material such as paperboard or corrugated cardboard.

FIG. 2 of the drawings illustrates the entrapment of ledge 7 between layers of corrugated cardboard 9 and 11. Referring again to FIG. 1 of the drawing, the essence of this invention is embodied in the provision of a ledge area 13 for supporting articles and preventing the articles from contacting the rigid material 9 and 11 during shipment. It should be noted that ledge 13 lies within the perimeter of flange 7 so as to not interfere with the ability of flange 7 to be trapped between layers of rigid material as at 9 and 11 in FIG. 2 of the drawings. It is seen in FIG. 2 that the article support member 1 comprises ledge areas 13 and 15 in order to support and prevent contact between supported articles and rigid material 9 and 11.

It is readily apparent however that it is not necessary for the article support member to have ledges and locators on either side thereof. Some instances it may be desirable to only have articles rest either upon or below the article support member. This is particularly true of pallets which are utilized either on the bottom or top of a series of layers of supported articles. Thus in FIG. 2 of the drawings pallets 17 and 19 are illustrated supporting yarn bobbins 21 and 23 by means of similarly shaped article support members 1. Each pallet would normally be provided with a plurality of article support members for use during shipment. It is readily apparent from FIG. 2 of the drawings that the pallets are capable of a nesting relationship upon return of the pallets for reuse after shipment.

*FIG. 3 of the drawings illustrates a prior art device which was utilized with a single sheet of crushable material wherein the rigid material was not isolated from load bearing. The FIG. 3 article may be utilized within the scope of this invention as described below.*

[Another embodiment of this invention is illustrated in FIG. 3 of the drawings wherein an article support member 31 is illustrated. The] *Referring to FIG. 3, the* article support member 31 comprises a locator which comprises a series of protuberances 33, 35, 37 and 39 which together constitute a single locator for placement within the hollow of a yarn bobbin. The support member illustrated at 31 comprises a flange area 41 for entrapment between two layers of rigid material. Additionally the article support member 31 comprises ledge area 43 for supporting articles and preventing the articles from contacting rigid material.

Article support member 31 comprises on the lower surface thereof a plurality of protuberances equal in number to but offset from the protuberances of the upper locator by the spacing 44 of a single protuberance so as to provide for a mating relationship between adjacent pallets regardless of the arrangement of the pallets. It is also preferred to utilize offset protuberances so as to provide for a highly versatile nesting when such support members are utilized.

It should be noted that locator 31 of FIG. 3 only a ledge area on one side thereof. However it is contemplated that the ledge areas in accordance with this invention be provided for each locator. By utilizing a ledge for each locator the rigid material is always isolated from the load bearing [nd] *and* the pallets may be utilized in a universal manner without need for referring to a top or bottom since both sides are identical.

The article support members in accordance with this invention are preferably formed from conventional thermoplastic material such as polyethylene polyvinylchloride and various other polymers and copolymers. Such articles may be formed by conventional injection molding or blow molding processes in a highly efficient and economical manner.

It is thus seen that this invention provides a novel shipping pallet for use in shipping which overcomes wear problems associated with the prior art pallets. It is further seen that this invention provides a novel article support member for use in such pallets and provides for highly compact nesting upon reuse.

What is claimed is:

1. A pallet for use in shipping a plurality of similarly shapped articles, comprising:

a plurality of elongated article support members each comprising, a centrally outwardly extending flange;

an article locator at each end of said support member; and a ledge area extending laterally from said flange *at one end of said support member* and being of less diameter than said flange and of greater diameter than said article locator;

at least two layers of crushable rigid material for entrapping said flange area of said article support member therebetween, said flange area thus being between said upper and lower planar surfaces of said rigid material; *and* wherein said other end of each of said support members includes means to support one of said articles and prevent said articles from contacting and crushing said rigid material;

and wherein said ledge [member] *area* extends beyond the planar surface of at least one surface of said rigid material for support of an article thereon and to prevent said article from contacting and crushing said rigid material and wherein said article locator lies within the perimeter of said ledge area.

[2. The pallet according to claim 1 wherein both sides of each of said support members function to support one of said articles and prevent said articles from contacting said rigid material.]

* * * * *